United States Patent
Baker et al.

(10) Patent No.: US 8,321,201 B1
(45) Date of Patent: *Nov. 27, 2012

(54) IDENTIFYING A SYNONYM WITH N-GRAM AGREEMENT FOR A QUERY PHRASE

(75) Inventors: Steven D. Baker, San Francisco, CA (US); John Ogden Lamping, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/050,902

(22) Filed: Mar. 17, 2011

Related U.S. Application Data

(63) Continuation of application No. 11/647,869, filed on Dec. 29, 2006, now Pat. No. 7,925,498.

(51) Int. Cl.
*G06F 17/27* (2006.01)

(52) U.S. Cl. .................. 704/9; 704/1; 704/10; 704/257; 704/270

(58) Field of Classification Search .............. 704/9, 257, 704/270, 1, 10
See application file for complete search history.

(56) References Cited

U.S. PATENT DOCUMENTS

| | | | |
|---|---|---|---|
| 5,265,065 A * | 11/1993 | Turtle | 1/1 |
| 5,331,556 A | 7/1994 | Black | |
| 5,594,641 A | 1/1997 | Kaplan | |
| 5,832,474 A | 11/1998 | Lopresti | |
| 6,466,901 B1 | 10/2002 | Loofbourrow | |
| 7,155,427 B1 | 12/2006 | Prothia | |
| 2002/0188586 A1 * | 12/2002 | Veale | 707/1 |
| 2003/0061122 A1 | 3/2003 | Berkowitz | |
| 2004/0078190 A1 | 4/2004 | Fass et al. | |
| 2004/0133418 A1 | 7/2004 | Turcato et al. | |
| 2005/0065774 A1 | 3/2005 | Doganata et al. | |
| 2006/0004744 A1 * | 1/2006 | Nevidomski (Alex Nevidomski) et al. | 707/4 |
| 2007/0005590 A1 | 1/2007 | Thrasher | |
| 2007/0011154 A1 | 1/2007 | Musgrove et al. | |
| 2007/0106499 A1 | 5/2007 | Dahlgren et al. | |
| 2007/0185702 A1 | 8/2007 | Harney et al. | |
| 2007/0203894 A1 | 8/2007 | Jones et al. | |
| 2009/0125497 A1 | 5/2009 | Jiang et al. | |

OTHER PUBLICATIONS

Office Action prepared for related case (U.S. Appl. No. 11/582,767), mailed from USPTO on Sep. 15, 2008.

* cited by examiner

*Primary Examiner* — Qi Han
(74) *Attorney, Agent, or Firm* — Fish & Richardson P.C.

(57) ABSTRACT

One embodiment of the present invention provides a system that identifies a synonym with N-gram agreement for a query phrase. During operation, the system receives a candidate synonym for the query phrase. Then, for each term in the query phrase, the system determines whether the term is a lexical synonym of a corresponding term in the candidate synonym or the term shares meaning with the corresponding term in the candidate synonym. If this is true for all terms in the query phrase, the system identifies the candidate synonym as an N-gram agreement synonym for the query phrase. The system then uses this identified N-gram agreement synonym to improve synonym mappings for query terms and/or query phrases.

51 Claims, 7 Drawing Sheets

| Test 410 | Score 420 | Base 430 | High 440 |
|---|---|---|---|
| frequently_alterable 450 | Ratio of pseudo-queries of a particular type that can be derived from both the original phrase and the synonym<br>= (i)/TDQ | 0.01 | 0.015 |
| frequently_much_in_common 460 | Fraction of user queries for which an altered query has at least three search results in common with the original query<br>= (iv)/(ii) | 0.6 | 0.85 |
| frequently_altered 470 | Fraction of user queries for which the original query is followed by the altered query within a user session<br>= (v)/TDQ | 0.0005 | 0.0015 |
| high_altering_ratio 480 | Fraction of user queries for which the original query is followed by the altered query within a user session divided by the fraction of user queries for which the altered query is followed by the original query within a user session<br>= (v)/(vi) | 1.0 | 3.0 |

FIG. 4

IDENTIFYING A SYNONYM WITH N-GRAM AGREEMENT FOR A QUERY PHRASE

RELATED APPLICATION

This application claims the benefit under 35 U.S.C. §119 (e) of U.S. application Ser. No. 11/647,869, filed on Dec. 29, 2006 entitled "Identifying a Synonym with N-Gram Agreement for a Query Phrase," the entirety of which is hereby incorporated by reference.

The subject matter of this application is related to the subject matter in a co-pending non-provisional application by the same inventors as the instant application and filed on the same day as the instant application entitled, "Ensuring that a Synonym for a Query Phrase does not Drop Information Present in the Query Phrase," having Ser. No. 11/647,888, and filing date Dec. 29, 2006. The subject matter of this application is also related to the subject matter in a co-pending non-provisional application by the same inventors as the instant application entitled "Determining Query Term Synonyms within Query Context," having Ser. No. 11/096,726, and filing date Mar. 31, 2005, and to the subject matter in a co-pending non-provisional application by Steven Baker, Maureen Heymans, Evan M. Martin, Dimitra Papachristou, Trystan G. Upstill, and Ke Yang entitled "Method and Apparatus for Generating Lexical Synonyms for Query Terms," having Ser. No. 10/582,767, and filing date Oct. 17, 2006.

BACKGROUND

1. Field of the Invention

The present invention generally relates to the field of information retrieval, and more specifically to the task of identifying synonyms for a query phrase to facilitate retrieving documents for queries which contain the query phrase.

2. Related Art

The World Wide Web (web) contains a vast amount of freely available information. However, locating a relevant item of information on the web can be a challenging task. Note that this problem continues to increase as the amount of information available on the web continues to grow.

Search engines can often help users to locate and retrieve a document of interest on the web. However, users often fail to select effective query terms during the searching process. For example, a user may enter the query [web hosting+fort wayne] when the city of Fort Wayne is usually referred to as Ft. Wayne. Or, a user may enter [free loops for flash movie] when most relevant pages use the term "music," rather than "loops" and the term "animation" rather than "movie." Thus, documents that satisfy a user's informational needs may use different terms than the specific query terms chosen by the user to express a concept of interest. Note that this problem becomes more of an issue as the number of terms in a query increases. For queries longer than three or four words, there is a strong likelihood that at least one of the terms is not the best term to describe the user's informational need.

Hence, there is a need to modify and/or expand user queries to include synonyms for query terms, so that retrieved documents will better meet the user's informational needs.

Unfortunately, solving this problem has proven to be a difficult task. A simple approach is to use pre-constructed synonym information, for example from a thesaurus or a structured lexical database. However, thesaurus-based systems have various problems. For example, they are often expensive to construct, and are generally restricted to one language.

A more significant issue is that the applicability of a synonym to a given phrase often strongly depends on the context in which the phrase is used. For example, the term "music" is not usually a good synonym for the term "loops," but it is a good synonym in the context of the example above. However, the context in the example above is sufficiently uncommon that the term "music" is not listed as a synonym for the term "loop" in standard thesauruses. Note that many other examples of contextually dependent non-traditional synonyms can be identified. Hence, even if conventional synonyms can be identified for a term, it may be difficult to identify specific synonyms to use in the context of a specific query.

Other conventional approaches for identifying synonyms cluster "related words." Such approaches suffer from the drawback that related words are not necessarily synonyms. For example, the words "sail" and "wind" would likely be clustered together (because they co-occur in numerous documents); however they are not synonymous. Hence, substituting one for the other is likely to lead to undesirable search results.

However, sometimes two or more terms in a query phrase may be linked, e.g. because of language agreement rules, so that multiple terms in the query typically change simultaneously. A system that analyzes changes of individual words (or unigrams) in a given context may not detect synonym mappings that encompass such simultaneous changes for multiple words.

Furthermore, some existing approaches for identifying a multi-term synonym for a query phrase may lead to undesirable search results. For instance, in some existing approaches for identifying synonyms, synonyms which are generated automatically for a multi-term query phrase can potentially drop important query terms, and as a result can produce overly-general search results.

Accordingly, what is needed is a method and an apparatus that identifies synonyms for query terms and/or query phrases without the problems described above.

SUMMARY

One embodiment of the present invention provides a system that identifies a synonym with N-gram agreement for a query phrase. During operation, the system receives a candidate synonym for the query phrase. Then, for each term in the query phrase, the system determines whether the term is a lexical synonym of a corresponding term in the candidate synonym or the term shares meaning with the corresponding term in the candidate synonym. If this is true for all terms in the query phrase, the system identifies the candidate synonym as an N-gram agreement synonym for the query phrase. The system then uses this identified N-gram agreement synonym to improve synonym mappings for query terms and/or query phrases.

In a variation on this embodiment, the system adds and/or modifies unigram synonym mappings between query terms found in the query phrase and the terms of the identified N-gram agreement synonym. By doing so, the system can extend the unigram synonym mappings and contexts to encompass simultaneous changes to multiple terms in the query phrase.

In a variation on this embodiment, the system determines whether a query term and a synonym term are lexical synonyms or share meaning by lexically comparing the two terms.

In a further variation, the system determines whether a query term and a synonym term are lexical synonyms or share meaning by checking if the query term and the synonym term share a common stem.

In a further variation, the system lexically compares the query term and the synonym term by doing one or more of the following:
- removing punctuation and/or spacing from a term;
- using an edit-distance technique while comparing the terms to determine if a substantial number of characters in the terms match;
- removing diacritical marks from a term;
- using a pseudostem technique to determine if the terms share a common prefix;
- using stemming techniques to identify lexical synonyms for terms;
- using language-specific linguistic rules to facilitate detecting gender and/or number stemming across the terms;
- identifying abbreviations for terms;
- stripping vowels from a term; and/or
- identifying non-lexical synonyms for one or more terms.

In a further variation, the system determines whether the query term and the synonym term are lexical synonyms or share meaning by semantically comparing the query term and the synonym term.

In a variation on this embodiment, the query phrase is a bi-gram which includes two terms.

In a variation on this embodiment, the query phrase and the candidate synonym include an equal number of terms.

In a further variation, the system identifies candidate synonyms for query phrases while searching for synonyms for individual query terms.

In a further variation, the system identifies a candidate synonym by gathering switching data from previous queries. This switching data indicates how users have switched query terms and query phrases when modifying queries to improve query results. The system uses this switching data to identify candidate synonyms for query terms and/or query phrases.

In a further variation, the system identifies possible query phrases from previous queries. The system then generates a set of probabilities for switching between query phrases based on observed patterns in the previous queries. Next, the system uses these switching probabilities to determine whether a switched query phrase may be a candidate synonym for a given phrase.

In a further variation, the system gathers context data for other terms located in proximity to query terms or query phrases in previous queries. The system uses this context data to generate conditional probabilities of switching between query phrases and query terms.

In a further variation, the system considers a switched phrase with a switching probability above a specified threshold as a candidate synonym.

In a further variation, the system uses the switching data to determine error-correction rules for queries. Next, the system uses the error-correction rules to identify valid synonyms for a query phrase.

In a further variation, the query phrase is written in a language with agreement rules, and adjacent terms in the query phrase follow these agreement rules. Note that in some languages, changing the first term in a query phrase without changing other terms in the query phrase can cause lack of agreement between terms in the query phrase, which can lead to poor search results. The system uses the above-described technique to find a synonym for the query phrase.

In a further variation, by using switching data to identify synonyms for query phrases the system tends to identify synonyms with terms that follow language agreement rules. This is because users tend to switch query phrases to synonymous query phrases with terms that follow language agreement rules. Note that a synonym-detection technique that determines synonyms for single terms in the context of surrounding terms may not detect synonymous query phrases in which multiple terms have been changed to satisfy language agreement rules.

In a further variation, the system identifies possible query phrases in a query by identifying sub-phrases of the query. The system then determines the candidate synonyms for the possible query phrases, and proceeds to identify valid synonyms from the candidate synonyms.

In a variation on this embodiment, a synonym for a query term or query phrase is a term or phrase which is substantially similar in meaning to and/or produces query results similar to query results produced by the query term or query phrase.

BRIEF DESCRIPTION OF THE FIGURES

FIG. 4 presents a table illustrating several tests that may be used to qualify the quality or strength of a candidate synonym according to one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling Ranking and Searching Processes

Figure 1:
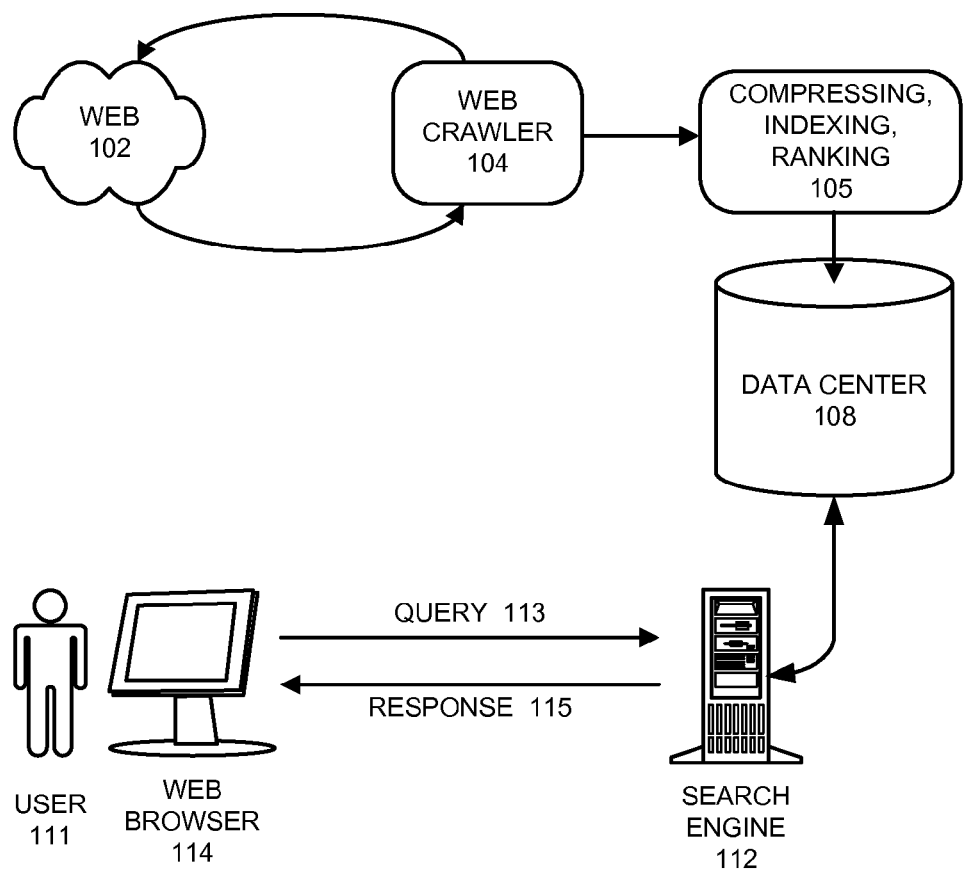
FIG. 1 illustrates the crawling, ranking and searching processes in accordance with an embodiment of the present invention.

FIG. 1 illustrates the crawling, ranking and searching processes in accordance with an embodiment of the present invention. During the crawling process, a web crawler 104 crawls or otherwise searches through websites on web 102 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through web browser 114, wherein the response 115 contains matching pages along with ranking information and references to the identified documents.

Synonyms

Figure 2A:
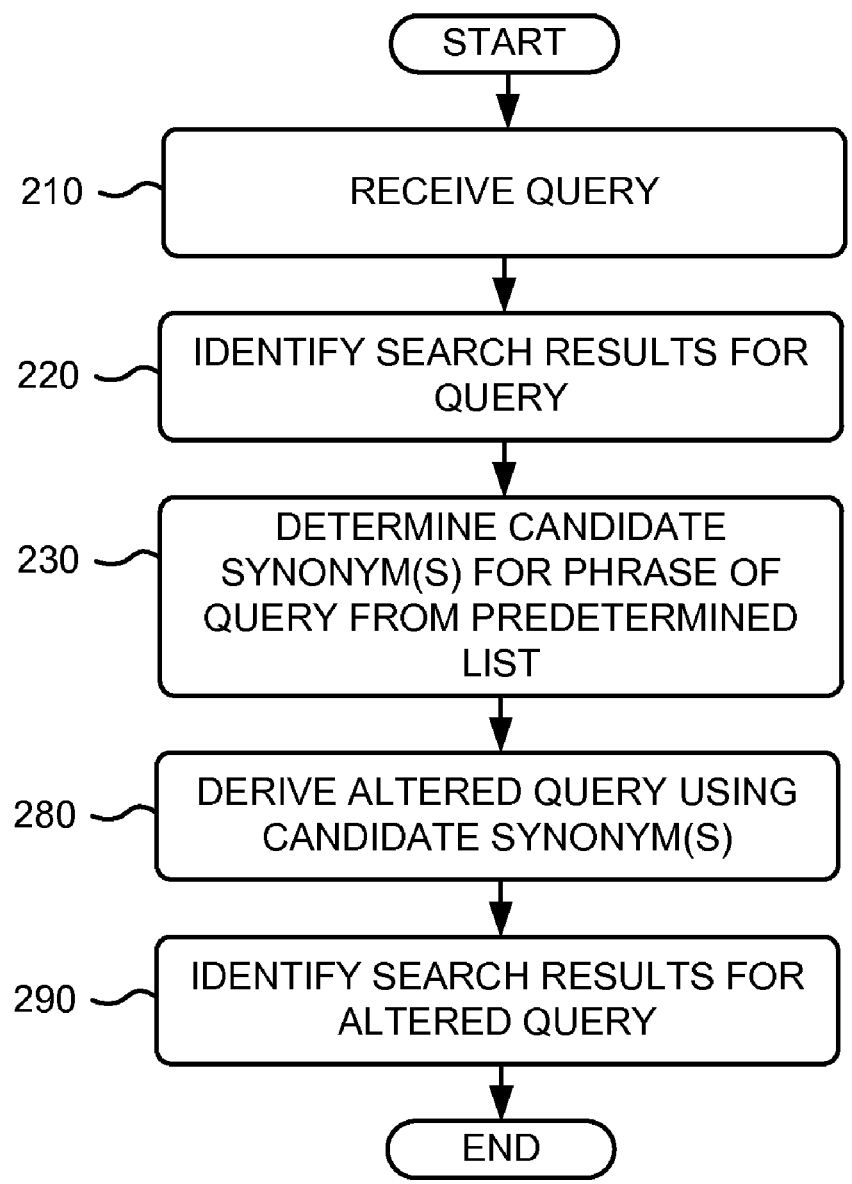
FIG. 2A presents a flowchart illustrating a method for producing altered queries according to one embodiment of the present invention.

FIG. 2A is a flowchart illustrating a method for altering queries to incorporate synonyms in accordance with an embodiment of the present invention. Initially, a search query is received from a client 110. In one embodiment, a front-end server is responsible for receiving the search query from the client (step 210). This front-end server provides the query to the search engine, which evaluates the query. In addition, the front-end server and/or search engine maintains various log files or lookup tables for storing each received query, as well as other information. More particularly, each query can be stored with a user identifier that identifies the particular browser and/or computer from which the query was received, a timestamp for the query, and a list of some number of the search results (e.g., a list of the top ten document IDs from the search). Other information related to user context or the search itself may also be stored.

Next, a list of search results for the search query is identified (step 220). In this example, the search engine evaluates the query to retrieve a set of search results for the search query and returns the results to the front-end server. During this process, the search engine communicates with one or more content servers to select documents that are relevant to the user's search query. (Note that a content server stores a large number of indexed documents, which are indexed (and/or retrieved) from different websites.) Alternately, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. An exemplary form of page rank is described in U.S. Pat. No. 6,285,999, which is incorporated by reference herein. The search engine assigns a score to each document based on the document's page rank (and/or other query-independent measure of the document's importance), as well as one or more query-dependent signals of the document's importance (e.g., the location and frequency of search terms in the document).

Figure 2B:
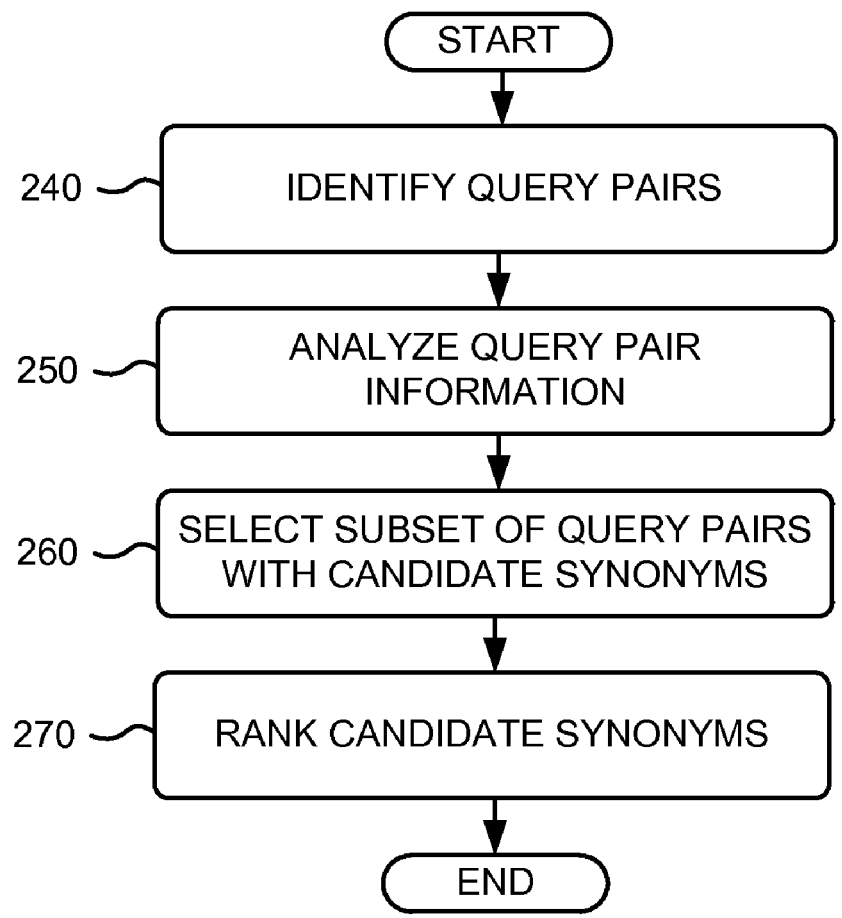
FIG. 2B presents a flowchart illustrating a process for determining one or more synonymous terms in the context of a query according to one embodiment of the present invention.

Then, one or more synonymous terms associated with a context of the search query are identified (step 230) from a predetermined list. Formation of the predetermined list may be accomplished using various processes. More specifically, FIG. 2B is a flowchart illustrating a process for determining one or more synonymous terms in the context of a search query according to one embodiment of the present invention.

First, query pairs are identified (step 240). (An example of this process is further described in conjunction with FIG. 3 below.) In one embodiment, this is accomplished by analyzing user query logs and lookup tables. The set of all queries received over some period are reviewed and all original and altered query pairs are identified. An altered query is defined as a query obtained by replacing a phrase in the original user query with a candidate synonym. A "phrase," in the context of the present invention is one or more individual words or terms. For example, an original user query might be [free loops for flash movie], and the altered query might be [free music for flash movie]. In addition, certain queries may be eliminated as having insufficient context. For example, queries used in the analysis may be required to have at least three terms. To facilitate identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed (step 250). For each query pair, additional information to suggest that the phrase in the original query and altered query are synonymous is identified. For example, the evidence may include the frequency with which both queries in the pair are entered by the same user within a short time interval, or the number of top results that the original query and altered query share.

To further ensure that candidates are effectively synonymous, one or more additional tests can be used. One such test is to determine whether for every query containing the phrase A, the corresponding query with the phrase B substituted for A has a moderately high probability of occurrence in the stored data. In one embodiment of the present invention, the required probability is 1%.

A second test is that, for every query containing A, the corresponding query with B substituted for A has a minimum probability of being entered by the same user in a short time interval. In one embodiment, the interval is an hour and the probability is 0.1% or greater.

A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 4.

These tests can also be performed for subsets of query pairs in which the phrases appear in a particular context of adjacent words. For example, in the query pair [killer whale free photos] and [killer whale download photos], the candidate synonym pair "free," "download" appears in the context of following "whale," which can be indicated as (whale:), in the context of preceding "photos," which can be indicated as (: photos), in the context of between "whale" and "photos," which can be indicated as (whale: photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free," the general context (:); for only occurrences of "free" following "whale," the context (whale:); for only occurrences of "free" preceding "photos," the context (: photos); and for only occurrences of "free" between "whale" and "photos," the context (whale: photos). Because many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not generally (i.e., in the general context) a good synonym for "free," is a good synonym in the context (: photos), and is not a good synonym in the context (: press). The conclusion in this example is that the context (: photos) is an exception to the general rule that "download" is not a good synonym for "free."

From the query pairs, a subset is selected (step 260) including phrases with candidate synonyms that meet certain criteria. In one embodiment, the criteria are some or all of the tests discussed above in the general context. In another embodiment, a number of top candidate synonyms are selected for the subset of query pairs. A synonym can be considered more significant than other synonyms, for example, if it is used in an altered query more often within user sessions, or if its altered query yields more search results in common with the original query.

Next, candidate synonyms are ranked (step 270), or qualified, using the criteria discussed above. Initially, a set of threshold conditions should be satisfied using the data gathered above as is discussed in greater detail in conjunction with FIG. 4. In one embodiment, the conditions may specify that for at least 65% of the original-altered query pairs, there is at least one search result in common and that the frequency with which the altered query follows (e.g., occurs within five sequential queries) the original query within a user session is at least 1 in 2000. Then, the statistics from step 250 are evaluated using a float scale function to determine a score for each qualified synonym, as discussed in greater detail in conjunction with FIG. 3. This score is a measure of the confidence in a qualified synonym. Depending on the application, greater or lesser confidence or strength will be required. Consequently, whether a qualified synonym is declared a useful synonym depends on the threshold value of evidence that is sufficient for the application.

Referring again to FIG. 2A, following identification in step 230 of synonymous terms, one or more altered queries are derived (step 280). Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment of the present invention, alternate queries are suggested that include the synonym, either as a substitution in or an addition to the query. In another embodiment, for example, when a user enters a given query, a number of alternative queries can be provided back to the user, along with the search results for the original query according to various methods. One such method is disclosed in U.S. application Ser. No. 11/094,814, filed on Mar. 29, 2005, entitled "Integration of Multiple Query Revision Models," which is incorporated herein by reference.

In another embodiment, the synonym is treated as equivalent to the original phrase automatically for purposes of document retrieval. For example, the original query can be modified by replacing the phrase with a synonym or a disjunction of the original phrase and a synonym when producing search results for the query.

From the above steps, a list of altered search results for the altered query is identified (step 290). In one embodiment, this list may include a maximum number of results.

Figure 3:
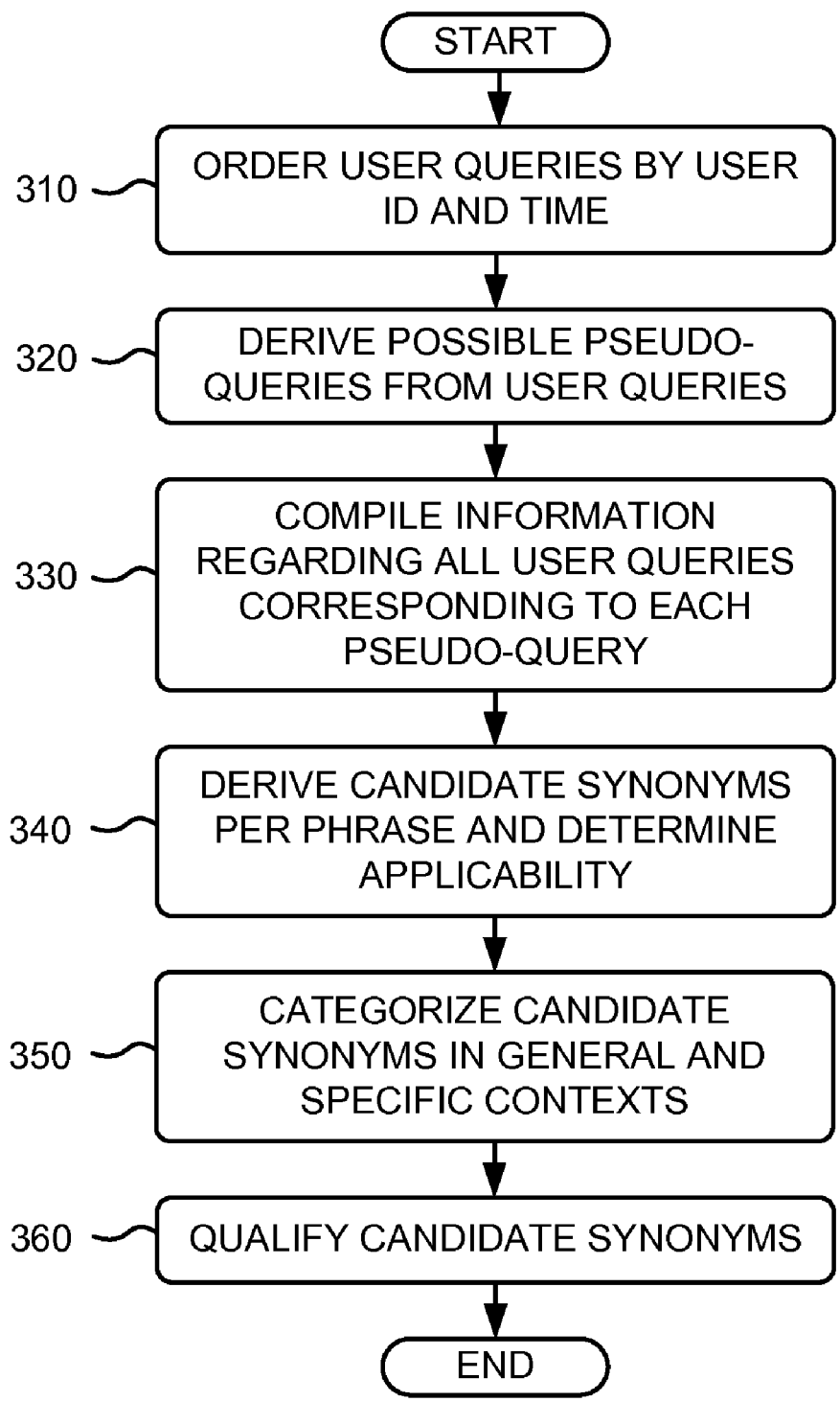
FIG. 3 illustrates an exemplary method for determining candidate synonyms for search query terms according to one embodiment of the present invention.

FIG. 3 depicts an exemplary method for determining candidate synonyms for search query terms according to one embodiment of the invention. The method operates in the context of an information retrieval system, which generally includes a front-end server, a search engine, and an associated content server. During operation, users access the system via a conventional client over a network operating on any type of client computing device, for example, by executing a browser application or other application adapted to communicate over Internet-related protocols (e.g., TCP/IP and HTTP). The information retrieval system can operate on high performance server class computers, and the client device can be any type of computing device. The details of the hardware aspects of server and client computers are well known to those of skill in the art and thus are not further described here.

The front-end server starts by receiving a search query submitted by the client. Next, the front-end server provides the query to the search engine, which evaluates the query to retrieve a set of corresponding search results, and returns the search results to the front-end server. Next, the search engine communicates with one or more of the content servers to select documents that are relevant to the user's search query. Note that a content server stores a large number of documents, which are indexed (and/or retrieved) from different websites. Alternately, or in addition, the content server can store an index of documents stored on various websites.

The term "document" as used in this specification and appended claims refers to be any form of indexable content, including textual documents in any text or graphics format, images, video, audio, multimedia, presentations, web pages (which can include embedded hyperlinks and other metadata, and/or programs, e.g., in Javascript), etc. In one embodiment of the present invention, each indexed document is assigned a page rank according to the document's link structure. The page rank serves as a query-independent measure of the document's importance. An exemplary form of page rank is described in U.S. Pat. No. 6,285,999, which is incorporated herein by reference. The search engine assigns a score to each document based on the document's page rank (and/or other query-independent measure of the document's importance), as well as one or more query-dependent signals indicating the document's importance (e.g., the location and frequency of search terms in the document).

The front-end server and/or search engine maintains various log files that store each received user query, in association with other information. More particularly, each query is stored with a user identifier that identifies the particular browser and/or computer from which the query was received, a timestamp, and, for some queries, a list of some number of the search results (e.g., a list of the top ten document IDs from the search). Other information, contextual of the user, the search, or the like may also be stored. The information in the log files is then analyzed according to the methods described herein.

First, all queries received over a period of time, such as a week, are sorted (step 310) by user ID (e.g., by cookie), and then by time. This organizes the queries into individual user sessions, where a session is defined as queries from an individual client device (or user) occurring with a given time interval, for example one hour (though longer or shorter definitions of a session may be used, as desired). Assume that within a one hour window from one user, the following queries were logged from a individual client device:

[gm cars]
[gm new car prices]
[gm used car prices]
[general motors used car prices]

First, certain queries are eliminated as having insufficient context; preferably queries used in the analysis have at least three terms. Thus, in the forgoing example, the query [gm cars] is eliminated.

For each remaining query, all possible query fragments or pseudo-queries, are formed (step 320) by replacing a sequence of one or more terms with a marker or token (e.g., ":"), while leaving at least two words in the pseudo-queries. For the query [gm used car prices], the pseudo-queries are:

[: used car prices]
[gm: car prices]
[gm used: prices]
[gm used car:]
[: car prices]
[gm: prices]
[gm used:]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session (step 330), which will be used to collect contextual information for the pseudo-queries, derive statistical information about term substitution, usage, and search result commonality. Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudo-query records as further described below. Step 330 also optionally annotates a pseudo-query record with the first ten resultant document IDs (indicated below as "url#") returned by the search engine in response to the query, either extracted from the log files (if available), or indirectly with a pointer or other reference to an external store of the results. According to one embodiment, fewer or no document IDs may be annotated, to reduce the required storage space.

If two or more user queries in a session have pseudo-queries in common, more than one record will be created that is keyed with the same pseudo-query, but the records will differ in their original user queries. In addition, if the related user queries occurred within five queries of each other, a sub-record is added to each record indicating that there was a related query in the same session. In addition, the sub-record notes the phrase that the related query had in place of the corresponding phrase in this query, and whether the related query occurred before or after the other query of the data record.

For the above example user session, one data record produced for [gm used car prices] would be
{pseudo-query: [gm: car prices],
   original_query: [gm used car prices],
   phrase: used,
   related_phrases: <{phrase: new, before: yes, after: no}>
   top_results: <url370293847, url123985709, . . . >
}
Another data record would be
{pseudo-query: [: used car prices],
   original_query: [gm used car prices],
   phrase: gm,
   related_phrases: <{phrase: general motors,
     before: no, after:yes}>
   top_results: <url370293847, url123985709, . . . >
}

Note that in these examples pseudo-query records, the field delimiters (e.g., "pseudo-query:") are explicitly shown for illustrative purposes only, and in practice, would not be present in the actual records themselves. In addition, in these examples "related phrases" are phrases that may be classified as candidate synonyms.

One of the data records produced for the query [gm new car prices] would have the same pseudo-query as the first record above:
{pseudo-query: [gm: car prices],
   original_query: [gm new car prices],
   phrase: new,
   related_phrases: <{phrase: used, before: no, after: yes}>
   top_results: <url123985709, url093475987, . . . >
}

Similarly, one of the data records produced for the query [general motors used car prices] would have the same pseudo-query as the second record above:
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}

The process of generating the pseudo-queries operates to make explicit the range of potential contexts of each phrase that is implicit within each query. The records corresponding to an individual pseudo-query reflect what is known (i.e., across all user queries in the logs) about one set of queries that differ in only one phrase.

The records for each pseudo-query are then analyzed (step 340) to generate a new set of records that reflect how well each phrase appears to function as a synonym for some other phrase, if it occurs in the given pseudo-query. Pseudo-query records are sorted by pseudo-query such that all records with the same pseudo-query are grouped together. For example, assume that the records for the pseudo-query [: used car prices] include the two from above, plus two more, all of which are shown below:
{pseudo-query: [: used car prices],
   original_query: [gm used car prices],
   phrase: gm,
   related_phrases: <{phrase: general motors,
     before: no, after: yes}>
   top_results: <url370293847, url123985709, . . . >
}
{pseudo-query: [: used car prices],
   original_query: [general motors new car prices],
   phrase: general motors,
   related_phrases: <{phrase: gm, before: yes, after: no}>
   top results: <url370293847, url123985709, . . . >
}
{pseudo-query: [: used car prices],
   original_query: [ford used car prices],
   phrase: ford,
   related_phrases: < >
   top results: <url283923887, url739572390, . . . >
}
{pseudo-query: [: used car prices],
   original_query: [gm used car prices],
   phrase: gm,
   related_phrases: < >
   top_results: <url370293847, url123985709, . . . >
}

Thus, there is another query, [ford used car prices], as well as another instance of the query [gm used car prices] from elsewhere in the logs. Step 340 generates a single record for each phrase that is identified in a pseudo-query. In other words, all records with the same pseudo-query are grouped together and a new record is created for each phrase covered by the group, reflecting how that phrase relates to the other phrases of the group for that pseudo-query. Continuing the present example, step 340 creates a record for each of the phrases "gm," "general motors" and "ford." Each record includes candidate synonyms for the respective phrase.

Each record output by step 340 identifies the ten most significant potential synonyms for each phrase. The significance of synonyms is determined at this stage independent of context according to a hierarchy of tests. First, a synonym that occurs in more related queries within sessions is considered more significant than one that appears in fewer related queries. Second, if two synonyms occur in the same number of related queries within sessions (as is likely to be the case, because relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than to simply count multiple occurrences of a given query.

Continuing with the present example, for the phrase "gm," and the pseudo-query [: used car prices], step 340 would output:
{phrase: gm,
    original_query: [gm used car prices],
    related_phrases: <{phrase: general motors, common_urls: 5,
        before: no, after: yes},
{phrase: ford, common_urls: 0, before:no, after: no}>
}

As illustrated, step 340 passes on the session information from step 330. For example, the data record above reflects the session queries "gm used car prices," "general motors used car prices," and "ford used car prices." In many cases, like "ford" in this example, there the original and altered queries may occur in different sessions, yet not occur together in a single session. Step 340 also compares the search results (using, e.g., the document IDs) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this step are sorted by phrase, gathering together all records produced by step 340 for each phrase.

For each phrase, step 350 computes statistics that reflect how well each candidate synonym functions as a synonym in general (i.e., in the general context, ":"), as well as in specific contexts. In the examples at this level of the analysis, candidate synonyms are selected from the observed "related phrases."Continuing the present example, assume that for the phrase "gm," step 350 receives the above record, plus two more:
{phrase: gm,
    original_query: [gm used car prices],
    related_phrases: <{phrase: general motors, common_urls: 5,
        before:no, after: yes},
    {phrase: ford, common_urls: 0, before:no, after: no}>
}
{phrase: gm,
    original_query: [gm new car prices],
    related_phrases: <{phrase: general motors, common_urls: 4
        before:no, after: no},
        {phrase: 2005, common_urls: 0, before:no, after: no},
        {phrase: best, common_urls: 1, before:no, after: no}>
}{phrase: gm,
    original_query: [nutrition of gm food],
    related_phrases: <{phrase: genetically modified, common_urls: 6,
        before: no, after: yes},
        {phrase: macdonalds, common_urls: 0, before: no, after: no}>
}

Step 350 determines how many queries contained a particular phrase and computes statistics for each candidate synonym of the phrase. In one embodiment, this includes determining the number of queries for which the corresponding query with the synonym:
  (i) existed (i.e., appeared in the logs);
  (ii) existed and there was result data for both the original and altered queries, so that common results were computed;
  (iii) existed and had at least 3 results in common;
  (iv) existed and had at least 1 result in common;
  (v) appeared earlier within a session; and
  (vi) appeared later within a session.

In this example, for the phrase "gm," and the candidate synonym "general motors," the statistical data is:
  (i) existed (i.e., appeared in the logs): 2;
  (ii) existed and there was result data for both the original and altered queries, so that common results were computed: 2;
  (iii) existed and had at least 3 results in common: 2;
  (iv) existed and had at least 1 result in common: 2;
  (v) appeared earlier within a session: 0; and
  (vi) appeared later within a session: 1.

This data is strongly suggestive that "general motors" is a good synonym for "gm," although, in practice, statistics should be gathered over at least 1000 queries including the phrase "gm" in order to have confidence in the statistics.

In addition to evaluating these statistics for each synonym in the general context, step 350 also gathers statistics for each context in which the phrase occurs frequently. For example, statistics are gathered for the 10,000 contexts for which the most queries exist. In this example, the contexts would be (:), (: used), (: used car), (: new), (: new car), (of:), (nutrition of:), (: food), and (of: food). Only one of the queries discussed in the above example (original queries [gm used car prices], gm new car prices], and nutrition of gm food]) belongs to each of these specialized contexts, except the general context, (:), which subsumes all three queries. Realistically, however, some contexts will include data from many queries. Step 350 evaluates the above statistics for each context, retaining, for each context, only the 20 most common candidate synonyms.

Step 360 further qualifies candidate synonyms using various tests. FIG. 4 is a table illustrating several tests that may be used to qualify the quality or strength of a candidate synonym according to one embodiment of the present invention. The tests 410 apply to statistics gathered in step 350.

The qualification begins by confirming that two preliminary conditions are satisfied. The first preliminary condition is that for at least 65% of the original-altered query pairs, there is at least one search result (e.g., a URL) in common.

The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries.

If both preliminary conditions are satisfied, step 360 evaluates a number of the statistics from step 350 as a group, according weight to each statistic. The evaluation can be based on the following function:

```
float Scale(float score, float base, float high) {
    float x=(score-base)/(high-base);
    float y=(x-sqrt(x*x+4.0))/2.0;
    return 1.0+y;
}
``` where score 420 (ratio the test determines), base 430 (target value), and high (scaling factor) taken from the tests 410 of FIG. 4, which are described in greater detail below.

A series of tests 410 shown in FIG. 4 that apply function Scale to the data evaluated in step 350. Scale is defined such that the value returned should be 0 when score=base, should asymptotically approach 1 when score 420 is large positive, and should be about equal to (score-base)/(high-base) when score 420 is large negative. The value of base 430 reflects a desired value for the given test. The individual tests are defined as follows.

frequently_alterable 450 provides a measure of whether, for each query with the phrase of interest, the corresponding altered query occurs often enough (preferable more than 1%) to suggest that the candidate synonym makes sense in context. This computation is (i) from step 350 (queries in log) over the total number of distinct queries including the phrase (TDQ).

frequently_much_in_common 460 evaluates whether the original queries and altered queries typically exhibit enough results in common to suggest that the meanings of the phrase and candidate synonym are similar. Preferably, at least 60% of altered queries have at least 3 search results in common with the original user query. This computation is (iv) from step 350 (had at least one result in common) over ii) of step 350 (result data existed for both original and altered queries).

frequently_altered 470 evaluates whether users occasionally try the substitution. Preferably, for every 2000 user queries, there is a corresponding altered query within the same session. This computation is (v) from 350 (appeared earlier within a session) over TDQ.

high_altering_ratio 480 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. This computation is (v) from step 350 (appeared earlier within a session) over (vi) from step 350 (appeared later within a session).

The following parameters are next computed based on the above tests:
soft_and =frequently_alterable+2*frequently_much_in_common
+0.5*frequently_altered+high_altering_ratio
evidence=1.0-exp(-soft_and/1.5),
where exp is the natural exponential function, and soft_and reflects the totality of the test metrics.

The value of this variable evidence is a measure of the strength of or confidence in a synonym, qualified as discussed above. A value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the Scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided back to the user, along with the search results for the original query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" OR "general motors." Alternatively, if the evidence for a synonym is relatively weak, the synonym can be used as suggestive rather than equivalent;

An aspect of the present invention includes a computer-implemented method to determine synonyms to serve as substitutions for phrases within an information search query. Candidate substitutions may be suggested to the user or automatically included in addition to or in place of the original query. Alternately, the candidate substitution may be used solely to modify the score associated with the retrieved documents. A formula may be used to assess the strength or quality of candidate synonyms, and the strength or quality may be compared to a threshold that is determined according to the application of interest.

Extensions

The preceding discussion described a generalized technique for discovering and generating context-sensitive synonyms. This technique is very useful, but it fails to take into account an important signal—lexical relationships between words. Consequently, the above-described technique misses many useful stems and other lexically similar words.

The following discussion remedies this problem by considering special classes of highly-trusted synonyms which are lexically related to the original word. We treat these synonyms differently and try to be more inclusive of them in our data. These lexically related words can be categorized in various ways, but all share the trait of there being a lexical connection between the original word and the synonym:

(1) synonyms that share the same stem as the original word, according to a industry-standard lexical stemming technique (e.g. car->cars);

(2) synonyms that differ from the original word according to punctuation or spacing differences (e.g. "wood stock"->woodstock, albertsons->albertson's);

(3) synonyms that are acronyms of the original word/phrase or vice versa. (e.g. VFW->veterans of foreign wars);

(3) synonyms that are similar according to a prefix-biased edit-distance technique;

(4) synonyms that are similar except for accenting on certain characters; and (5) synonyms that are abbreviations of each other (hrs->hours).

The following section discusses specific implementations that detect lexical relationships between two words, as well as a scheme to include this signal in synonym generation (as described above) and scoring their confidences that can be applied generally to anything that we deem is lexically similar.

First we describe specific mechanisms for establishing lexical similarity, and then we describe a general technique that can use these detection mechanisms.

Detecting Lexical Similarity

Decompounding/Compounding

We have developed a technique for detecting synonyms that differ from the original word only by punctuation or spacing. This technique is fairly simple. One possible implementation is to run through the original word and the synonym and strip out all punctuation and spaces (both defined according to an accepted standard of character sets, e.g. UTF8). We then compare the results, and if they are equal, the synonym falls into this class. These types of synonyms tend to be prevalent in Germanic languages. An example in English is woodshed->"wood shed". Stripping out the spaces from both, we get "woodshed" and "woodshed" which are identical. An example of a punctuation difference is albertson's->albertsons. Stripping out punctuation, "albertson's" and "albertsons" are the same.

Acronym Synonyms

If one of the words is a single word, we run a standard edit-distance procedure to align the original word and the phrase. If a substantial number or fraction of the characters in the single word align with the first letters of the synonym phrase (or vice versa), we detect this as an acronym. In addition, we also collect the first characters of all the words in the phrase and run the edit-distance procedure again against the single word. If they are sufficiently similar (e.g. we allow only max_length*0.25 edits), we deem it an acronym. An alternate but simpler implementation might be to simply check that all characters in the word align with the first character of each word in the phrase. For example, in the first implementation, consider the acronym NASA->"National Aeronautic and Space Administration". We would extract from the phrase "NAASA" and try to align that with "NASA". There would be one edit (the edition of an "A"). The maximum length of both strings is 5, so ⅕=0.20 is below our 0.25 edit-distance threshold. The edit-distance threshold is not fixed, but could be set based on empirical measurements.

Pseudostems

One problem with standard stemming techniques is that they typically aim to be conservative because in the past they have been used to identify stems without the help of any additional signals. Our intent in identifying lexical variants is to use this as just one signal in a system that already produces high quality synonyms and stems.

Therefore, we developed a "pseudostemming" technique that is fairly aggressive compared to conventional stemmers. It works as follows. First, if the original word and the candidate synonym differ by 1 edit, we conclude it's a pseudostem. Otherwise, we use a sequence of tests: First we compute the length of the common prefix the two words share. In one embodiment of the present invention, we require that the number of characters of matching prefix divided by the maximum length of either string be greater than some threshold. For example, for "shuttler" and "shuttling", the common prefix is "shuttl", of length 5. The max length is 9, so the ratio is 5/9, which is 0.56. An empirically determined threshold can be 0.5, so this first test passes.

After the first test, we examine the leftover parts of both words after the common prefix. In the above example, that would be "er" from "shuttler" and the string "ing" from "shuttling". We calculate the edit distance between the leftovers. In this case, that'd be an edit distance of 3 (using a character mismatch cost of 1).

We can also require that this edit distance of the leftover components be less than some fraction of the max length of both strings. For example, the maximum length in the present example is 9, and our current fraction threshold is 0.4, so this is 0.4 *9=4.4. An edit distance of 3 is <4.4, so in this case, the leftover edits would also pass this test. Because these two tokens pass both second tests, we declare them to be pseudostems.

Diacriticals

Finally, in many non-English languages the use of diacritical marks and accents are extremely common. We can strip these marks off with both language-specific and universal de-accenting. If the words are equal after stripping, they classify as lexical variants. In addition to doing this to the original words, we also do this stripping and input the stripped versions of the words to all of the above techniques. This allows us to catch the case where, for example, a character may be accented in the phrase for an acronym, but is not accented in the acronym itself. Similarly, this means that comparing an accented to unaccented character does not count as an edit in the pseudo-stemming or other techniques.

Gender/Number Stemming Detection

Using linguistic rules that are specific to each language, it is possible to develop a classifier that says that one word is a "conservative" stemming variant of another.

Abbreviations

Many people use abbreviations or short-hands for words. For example, "hours" can be written as "hrs" or "people" as "ppl". We detect abbreviations by stripping all vowels from both words, running a standard minimum edit-distance technique, and making sure that the number of edits between the stripped words is small compared to the maximum length of both words. For example, stripping vowels from "hours" we get "hrs". We compute the edit distance between "hrs" and "hrs", which is 0. The maximum length is 3 characters, so the ratio is 0/3, or 0.0. This ratio is less than an acceptable edit-distance threshold, which is empirically determined. (For point of reference, it is currently 0.25)

The above hodgepodge of techniques should not be considered exhaustive. We can use the above techniques and also standard stemming techniques to identify trusted lexical synonyms. In particular, we can use the Lovins and Porter stemmers, but other stemmers are known to those trained in the art and could be suitable replacements.

Using Lexical Similarity Detection in a Synonym Generation System

Note that we previously discussed how we used various signals to verify that a word is indeed a synonym. We can extend this technique to cover lexical synonyms. In one embodiment of the present invention, determining whether a word is a synonym involves considering: (1) a common result requirement, which specifies how frequently common query results should be produced when the word is substituted with the synonym in a query; and (2) a session switching requirement, which specifies how often a user switched the word with the synonym in a given session.

Note that the common result frequency and the session switching frequency provide a rough estimate of how closely the original word and the synonym are semantically related. Because the above detectors for lexical synonyms give us a stronger belief that the words are semantically related, we can lower our requirements for common results and for session switching for these classes of synonyms. Note that we can determine how far to lower these requirements empirically.

We found empirically that acronyms, compounds, and decompounds tend to have quite different results and sometimes have low session switching, so one embodiment of the present invention requires no common results for such lexical variants. Also, for compounds and decompounds and punctuation variants we can use ⅓ of the requirement for session switching as compared to general synonyms. This is because compounds and simple punctuation variants almost always mean the same thing, so we trust whatever evidence we have.

For pseudostems, stems, general/number stems, and abbreviations we can trade-off a high session switching rate and a high frequency of occurrence of queries with the substitution anywhere in the logs for a decreased common results requirement. In one embodiment, this includes a high threshold on session switching and the appearance anywhere in the logs (outside of sessions) of the synonym, which then triggers a lower threshold on common results. One could also create a different embodiment that trades the signals with an appropriate mixing function, which is approximated by the threshold in the embodiment above.

The above specify schemes that are specific to each lexical type in one embodiment of this invention, but one skilled in the art could recognize alternate schemes, such as categorizing the types into trust levels, symbolized by a number. This number could be used to modulate an aggressivity function for mixing signals that could be equivalent to the above embodiment.

Using Lexical Similarity to Highlight Synonyms in Search Result Snippets

The above techniques provide a way for recognizing lexically similar synonyms when generating synonym data. In addition to this process, we also use these methods as a filter to decide to highlight/bold the synonym in search result snippets, similar to how we highlight original query terms.

Alternatives

There are a number of alternatives to the above-described techniques. One might use different stemming techniques to decide that tokens share the same stem. One might also use slightly different edit-distance techniques or a slightly different pseudostem filter (instead of using max length of strings, use average length, for example). One might also use the lexical signals to modulate synonym generation differently. Instead of using a different threshold for trusted lexical synonyms, we might rate the level of trust and divide some base threshold by trust.

Synonyms for Multi-Term Query Phrases

The previous sections describe general techniques for discovering and generating context-sensitive synonyms. These techniques are useful for identifying synonyms for a given word in a given context, but often only consider information about words that can be used to exactly replace a single target word with a synonym. In one embodiment of the present invention, the system is extended to additionally generate synonym data for multi-term phrases. In one embodiment of the present invention, the system identifies synonymous query phrases from session-switching data obtained from logs of user queries.

Generating synonyms for multi-term query phrases can give rise to some additional challenges and capabilities. For instance, in some situations information can be dropped in a synonym, thereby negatively affecting the quality of search results generated using the synonyms. We refer to this information dropping as a "pseudo-drop," and describe a technique for detecting pseudo-drops. In another situation, the system may identify and use an identified multi-term synonym that has N-gram agreement with a query phrase to bolster unigram synonym mappings, thereby improving search results.

Pseudo-Drops

As described previously, based on session-switching data, a single term in a query may map to a single-term synonym, e.g. the term [fl] mapping to the synonym [florida], [fl]->[florida]. However, using session-switching data in the same way to automatically generate candidate synonyms for multi-term query phrases may lead to problematical synonyms. For example, session-switching data and/or other signals may indicate that [fl rentals]->[florida] is a good synonym. However, because [florida] is a good synonym for [fl], the use of this synonym effectively drops the concept [rentals]. Such an occurrence is called a "pseudo-drop."

Note that multi-term to single-term synonyms are often valid. For instance, the synonym [united kingdom]->[uk] is valid, because no information is lost, and neither of the subcomponents of [united kingdom] will individually resolve to [uk]. This is different from a mapping such as [jackson ms]->[mississippi], in which the state abbreviation also individually maps to the state name, i.e. [ms]->[mississippi]. In this example, the concept "jackson" is dropped.

Because the system may combine search results from both the initial query as well as synonym-based queries that include synonym substitutions, a term in the initial query that is dropped in a synonym-based query may still influence the search results, but with diminished influence. For instance, consider a query string such as "Jackson MS fire department." If the query phrase [jackson ms] is considered to be synonymous with the term [mississippi], the synonym-based query "mississippi fire department" may be used in place of (or addition to) the original query. This may cause a resulting page associated with the fire department in the town of Jackson, Miss. to be replaced with a state fire department page that has a higher page rank. However, by analyzing the data for the subcomponents of [jackson ms], e.g. [jackson] and [ms], the system can determine that one of the subcomponents of the query phrase, [ms], also maps to [mississippi], and hence can recognize that the mapping [jackson ms]->[mississippi] drops data and should not be used as a synonym.

Pseudo-Drop Detection

In one embodiment of the present invention, when the system identifies the synonyms for a multi-term query phrase, the system downgrades or disallows any candidate synonym that is also a reasonable synonym of one of the subcomponents of the multi-term query phrase.

Figure 5:
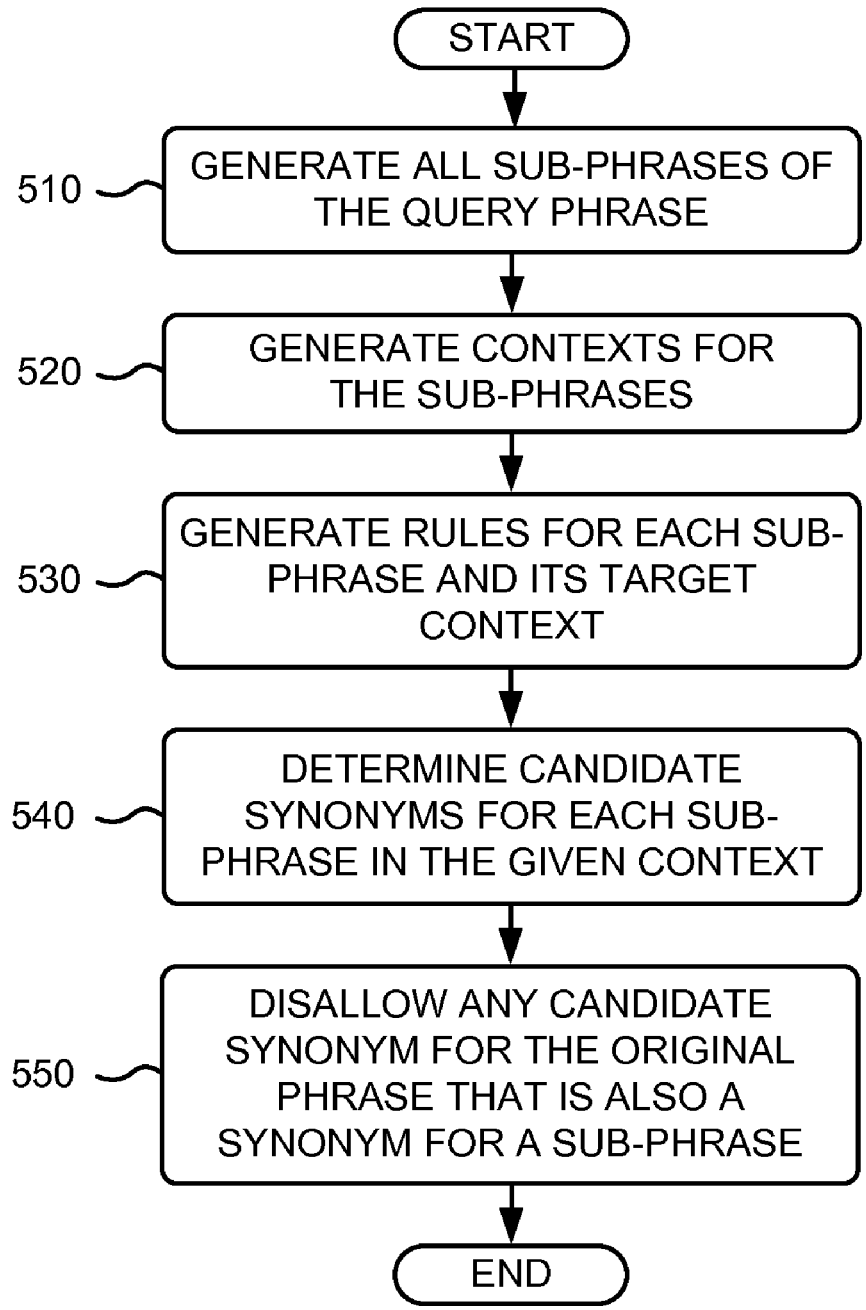
FIG. 5 presents a flow chart illustrating the process of ensuring that a synonym does not drop information from a query phrase in accordance with an embodiment of the present invention.

FIG. 5 presents a flow chart illustrating the process of ensuring that a synonym for a query phrase does not drop information from the query phrase. First, the system generates all sub-phrases of the query phrase (step 510). For a query phrase that is k words long, the system first generates all sub-phrases of length k-1, next generates all phrases of length k-2, and continues until it generates all sub-phrases of length one (i.e. single words). For instance, for the query phrase [fl rentals condos], which has three words, the system would first generate all sub-phrases of length two, and then proceed to generate all sub-phrases of length one.

More specifically, in one embodiment of the present invention, the system computes the sub-phrases of a given length L, as follows. First, the system starts with the first word in the original query phrase, and proceeds to concatenate words following the first word until the sub-phrase includes L words. Then, the system advances the starting point by one word, and computes the next sub-phrase. The system continues to advance the starting point until the end of the current L-length sub-phrase is at the end of the original query phrase.

For example, for the query phrase [fl rentals condos], the system generates sub-phrases of length two by starting at "fl" and concatenating "rentals" to generate the new phrase [fl rentals]. The system then advances the starting point one word, and starts at rentals to compute the next sub-phrase of length two, [rentals condos]. At this point, the system detects that "condos" is the end of the original query phrase, and stops. After generating all phrases of length two, the system generates all phrases of length one, starting again from "fl." The first sub-phrase of length one is [fl], after which the system advances one term to compute the next sub-phrase, [rentals]. Advancing again, the system finds the next sub-phrase, [condos], and detects the end of the original query phrase. Hence, for the query phrase [fl rentals condos], the system generates a sub-phrase list containing:

[fl rentals];
[rentals condos];
[fl];
[rentals]; and
[condos].

In the next step of the process, the system uses the original query phrase and the context of the original query phrase to generate a new context for each of the sub-phrases (step 520). When computing each sub-phrase of the original query phrase, the system tracks other terms leftover from the original query phrase. For instance, for the phrase [fl rentals] in the original context (cheap: ocean), the system first identifies the sub-phrases [fl] and [rentals]. For [fl], the system notes that the term "rentals" should be to the right of "fl" in the original query phrase, and generates a new context for the sub-phrase [fl] by concatenating the suffix of the original context, (: ocean), to the portion leftover from the original query phrase. If available, the system can also concatenate the portion of the original query phrase that precedes the sub-phrase onto the original query phrase's context prefix. Hence, for [fl], the system concatenates the original suffix "ocean" to the leftover "rentals." Because no terms precede [fl] in the original query phrase, the system uses the previous context prefix, "cheap," as the new prefix. The most specific resulting context for [fl] is (cheap: rentals ocean).

For [rentals], the leftover term preceding [rentals] is "fl." Hence, the system concatenates "fl" to the original prefix and leaves the original suffix unchanged, thereby resulting in the new target context (cheap fl: ocean) for [rentals]. At this point, the system has produced every possible sub-phrase for the target phrase in the target context, as well as the maximally-specific context appropriate to each sub-phrase.

In the next step of the process (step 530), the system generates synonym rules for each sub-phrase and its context. The system then uses these synonym rules to identify candidate synonyms that apply for each sub-phrase in the given context (step 540). After determining the candidate synonyms, the system determines whether any candidate synonym of the original query phrase is also a synonym for a sub-phrase in the target context. If so, the system disallows the candidate synonym (step 550).

In one embodiment of the present invention, the system determines synonyms in an offline synonym-discovery process that analyzes data from previous queries. Note that the system can use different techniques to calculate the synonyms for the sub-components of a phrase. For instance, the system may generate all synonyms for a phrase and its sub-components in a first pass, and can then look up the synonyms for the sub-components in a second pass. Alternatively, the system may build rules on-the-fly using a more aggressive synonym selection method.

In a further embodiment, the system can remove or weaken rules that may cause pseudo-drops during the offline process by comparing every synonym of every multi-word phrase with synonyms for the phrase's sub-components. The system may also use synonym rules and other data generated during the offline process while processing a query to look up synonyms for a query phrase and its sub-components. Note that the system might only build synonym rules for phrases of a specified size, e.g. only determining candidate synonyms for phrases with three or less terms.

In one embodiment of the present invention, the system uses a conservative notion of synonyms during pseudo-drop detection to reduce the probability of dropping information. A conservative notion of synonyms may relax the typical probabilities and/or techniques used to identify a candidate synonym in order to identify a larger set of candidate synonyms which can then be used to reduce the likelihood of pseudo-drops. For instance, the system may reduce the influence of synonym-detecting techniques that relate to: terms sharing common results, the alterable rate, or a minimum probability for co-occurrence of terms. Instead, the system can determine a (larger) set of candidate synonyms based on the measured probability of users switching from the original term (or query phrase) to a candidate synonym in a given context.

A technique that detects additional candidate synonyms and/or contexts increases the probability of detecting pseudo-drops that might otherwise not be detected. For instance, the system may identify the synonym [ms]->[mississippi] in a context that allows the system to determine that the mapping [Jackson ms]->[mississippi] (in a given context) is a pseudo-drop.

In one embodiment of the present invention, the system only uses synonym rules for a sub-phrase if these rules are produced in a context that is at least as specific as the context that contains all of the remaining or leftover words from the original phrase. Using context information in this way increases the likelihood that the synonym will apply to the original query phrase.

For instance, in the case of [fl] as a sub-phrase of [fl rentals] in the context of (cheap: ocean), the system does not trust synonyms of [fl] in the general (:) context. The system also does not trust synonyms for [fl] in the context of (cheap:). Instead, the system expects that the leftover portion of the phrase ("rentals") be present in the context of potential synonyms, e.g. expecting a context such as (: rentals), (cheap: rentals), or (cheap: rentals ocean). The system may only consider synonyms from such a specific context because synonyms that might look like pseudo-drops in a general context often are no longer pseudo-drops in a specific context. For example, the synonym [1 01]->[1.01] is often a good synonym that might, for instance, arise from users adding a decimal point as an error correction. However, in light of another separate rule, [1]->[1.01] in the context (:), this synonym ([1 01]->[1.01]) may look like a pseudo-drop for [1] in context (:), because it seems to drop the [01] portion of the original phrase in following the rule. The rule [1]->[1.01] may, however, come from a different context in which, for instance, users add more detail to the original query term [1] in queries by adding the "0.01". However, this rule, when applied to the sub-phrase [1] from [1 01]->[1.01], would cause a naïve system to reject the [1 01]->[1.01] synonym as a pseudo-drop, which is incorrect. For the case of [1] in the context (:01), users would typically never switch [1] to [1.01] (thereby effectively creating a query such as "1.01 01"). Instead, users are more likely to switch the entire phrase to [1.01]. Hence, by only considering synonyms from more specific contexts, the system can avoid such false positives when attempting to detect pseudo-drops.

N-Gram Agreement

N-gram agreement occurs when adjacent words in a multi-word phrase follow a set of agreement rules. For instance, in some foreign languages the combination of an article, an adjective, and a noun may change in tandem based on the gender and plurality of an item, e.g. in Spanish, "la salsa roja" and "las salsas rojas." N-gram agreement can negatively impact the process of finding unigram synonyms for query terms in a phrase. For example, users are more likely to change the query "salsa roja" to a grammatically correct synonym with bi-gram agreement, such as "salsas rojas," than to grammatically incorrect synonyms such as "salsa rojas" or "salsas roja". However, such a query modification that changes multiple terms simultaneously reduces the likelihood of the system determining unigram mappings such as [salsa]->[salsas] in the context (: roja) and [roja]->[rojas] in the context (salsa:). Although these rules might result in ungrammatical synonyms, such mappings might still provide useful query results. A system that detects candidate synonyms that have N-gram agreement with a query phrase could create and/or adjust unigram synonym rules to allow synonyms that otherwise might not be detected but would return beneficial results.

Another example is the French phrase "page jaune," which has the plural form "pages jaunes." Based on switching data the system may determine a synonym rule of [page]->[pages] in the context (:) that has a high confidence (e.g. 0.86). This synonym rule might only seldomly be detected in a specific context such as (: jaune), because it would violate language agreement and grammar rules. A change from [page jaune] to [pages jaune] would only occur if users make an ungrammatical switch, which is unlikely based on empirical data that suggests that users typically write grammatical queries. The synonym rule [jaune]->[jaunes] in the context of (page:) is also unlikely, for similar reasons. However, using either one of the rules might yield beneficial search results, and rewriting both unigrams at the same time would result in a synonym-based query that is semi-grammatical. If the system could detect the multi-term mapping from [page jaune]->[pages jaunes], it could bolster the [jaune]->[jaunes] and [page]->[pages] unigram rules, thereby improving the final search results.

For cases where multiple adjacent query terms change simultaneously, as shown with the N-gram agreement examples above, because both the (individual) target term and the context change, a system based purely on unigram rules and contexts will typically not find valid unigram synonyms that encompass the multi-word phrase. Switching data, however, can identify when a new group of terms is frequently used to replace an original set of terms. Hence, what is needed is a technique that allows the system to identify valid synonyms with N-gram agreement for multi-word phrases, and then bolster unigram synonym rules accordingly to overcome the lack of user behavior data for the unigram.

Identifying Synonyms for Multi-Term Query Phrases

Figure 6:
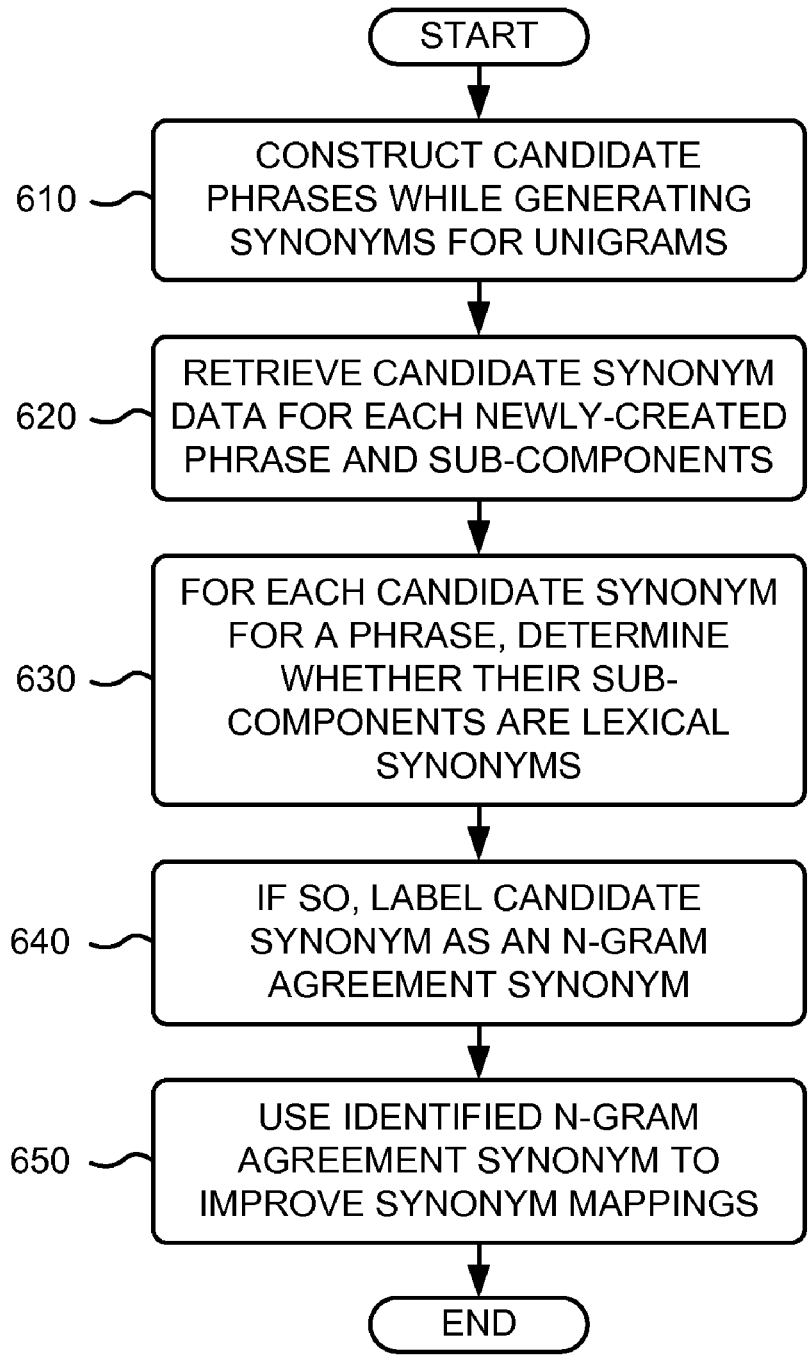
FIG. 6 presents a flow chart illustrating the process of identifying candidate multi-term synonyms in accordance with an embodiment of the present invention.

FIG. 6 presents a flow chart illustrating the process of identifying candidate synonyms with N-gram agreement for multi-word phrases. First, while generating synonyms for a unigram in a non-general context, the system also creates and gathers data for multi-term phrases by concatenating previous and/or following words in the unigram's context with the unigram (step 610). For instance, consider the term [b] in the query [a b c d]. While searching for unigrams for [b] in the context (a: c d), the system can also search for bi-gram (or two-term) phrases that include [b]. For example, looking at the current context, the system identifies two possible bi-grams that use [b], namely [a b] and [b c].

Next, the system retrieves the candidate synonym data for each newly-created phrase in the associated context. In doing so, the system retrieves both synonyms for the entire phrase as well as synonyms for the sub-component unigrams of the phrase (step 620). Then, the system analyzes each candidate synonym for the entire phrase. During this process the system determines whether the sub-components of the phrase and each corresponding sub-component of the candidate synonym are lexical synonyms (step 630). If so, the system labels the candidate synonym as an N-gram agreement synonym (step 640). Finally, the system uses the identified N-gram agreement synonym to improve synonym mappings (step 650).

For instance, for a bi-gram phrase [a b] with a candidate synonym [a' b'], the system determines whether (a, a') and (b, b') are both lexical synonym pairs. If so, the system labels [a' b'] as a potential lexical bi-gram agreement synonym for [a b].

In one embodiment of the present invention, lexically comparing a sub-component term of a phrase with a correspondingly-aligned sub-component term of a candidate synonym involves:

determining whether the terms share a common stem;
removing punctuation and/or spacing from a term;
using an edit-distance technique while comparing the terms to determine if a substantial number of characters in the terms match;
removing diacritical marks from a term;
using a pseudostem technique to determine if the terms share a common prefix;
using stemming techniques to identify lexical synonyms for terms;
using language-specific linguistic rules to facilitate detecting gender and/or number stemming across the terms;
identifying abbreviations for terms;
stripping vowels from a term; and/or
identifying non-lexical synonyms for one or more terms.

Note that comparing the phrase and the candidate synonym may also involve determining whether the query phrase and the candidate synonym both include an equal number of sub-component terms. For instance, the system might not compare a bi-gram phrase with a candidate synonym that is a unigram or a tri-gram.

In one embodiment of the present invention, the system can also semantically compare a sub-component of a query phrase with a sub-component of the candidate synonym, either in conjunction with a lexical comparison as well as independently. The system may use such a semantic comparison to find synonyms in situations where two or more adjacent terms in a multiple-term phrase typically change simultaneously, but do not share lexical roots. For example, the switch data may show that users frequently change the phrase [fast car] to [quick auto] as a single unit. By semantically comparing the pairs (fast, quick) and (car, auto), the system can determine that [quick auto] is a synonym for [fast car].

In one embodiment of the present invention, the system uses an identified N-gram agreement synonym to improve synonym mappings for query terms and/or query phrases. For instance, the system can add and/or modify unigram synonym mappings between query terms found in the query phrase and the terms of the identified N-gram agreement synonym. Hence, the system can extend unigram synonym mappings and contexts to encompass simultaneous changes to multiple terms in the query phrase.

In one embodiment of the present invention, the identified N-gram agreement synonym is used to improve synonym mappings for unigrams. For instance, the system can compute the confidence of the N-gram agreement synonym, transfer the confidence value to the equivalent unigram synonym, and then take the maximum confidence values over all the possible unigram synonyms.

Multiple simultaneous changes to terms in a single query may also indicate that the changes are grammar corrections, because empirical data indicates that users typically correct multiple grammatical errors in a query simultaneously. Similarly, directional changes in synonyms for unigrams may also indicate the changes are grammar corrections, as well as one-way mappings from a "less good" search term to a "better" term, such as users modifying query terms to narrow down query results until a desired result is found. These types of changes can cause the system to generate a set of synonym rules that map from a more general term to a specific term, for instance from [back fusion] to a more medically-specific [spine fusion]. A set of inverse synonym rules that go from specific to general is unlikely in such situations, because user search behavior typically does not progress from specific queries back to more general queries.

In one embodiment of the present invention, the system detects such one-way synonym rules for given contexts that indicate likely error corrections, and uses such rules as indications of language agreement corrections.

In summary, a system that finds synonyms to improve search query results can be expanded to consider multi-term phrases. In one situation, detecting candidate synonyms for multi-term phrases can lead to synonym rules that cause pseudo-drops. In one embodiment of the present invention, the system performs pseudo-drop detection to find and eliminate pseudo drops. In another embodiment of the present invention, the system finds synonyms with N-gram agreement for multi-term query phrases, and uses such N-gram agreement synonyms to bolster unigram synonym rules.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-readable storage medium encoded with a computer program, the program comprising instructions that, when executed by one or more computers, cause the one or more computers to perform operations comprising:
    receiving a multi-term synonym phrase that is a candidate synonym for a multi-term query phrase; and
    determining that each term of the query phrase is a lexical synonym of a corresponding term of the synonym phrase or shares meaning with the corresponding term of the synonym phrase;
    in response to determining that each term of the query phrase is a lexical synonym of the corresponding term of the synonym phrase or shares meaning with the corresponding term of the synonym phrase, using the query phrase and the synonym phrase to improve a synonym mapping between a particular term of the query phrase and a term of the synonym phrase that corresponds to the particular term.

2. The computer-readable storage medium of claim 1, wherein improving a synonym mapping between a particular term of the query phrase and a term of the synonym phrase that corresponds to the particular term comprises using the term of the query phrase and the term of the synonym phrase to add and/or modify synonym mappings and/or context data for the term of the query phrase and the term of the synonym phrase.

3. The computer-readable storage medium of claim 1, wherein determining that a term of the query phrase is a lexical synonym of a corresponding term of the synonym phrase or shares meaning with the corresponding term of the synonym phrase comprises lexically comparing the term of the query phrase and the term of the synonym phrase.

4. The storage medium of claim 3, wherein determining that a term of the query phrase is a lexical synonym of a corresponding term of the synonym phrase or shares meaning with the corresponding term of the synonym phrase includes determining that the query term and the term of the synonym phrase share a common stem.

5. The storage medium of claim 4, wherein lexically comparing the term of the query phrase and the term of the synonym phrase includes one or more of the following:
    removing punctuation and/or spacing from a term;
    using an edit-distance technique to determine whether a substantial number of characters match between the term of the query phrase and the term of the synonym phrase;
    removing diacritical marks from a term;
    using a pseudostem technique to determine whether the term of the query phrase and the term of the synonym phrase share a common prefix;
    using language-specific linguistic rules to facilitate detecting gender and/or number stemming across the term of the query phrase and the term of the synonym phrase;
    identifying an abbreviation for a term;
    stripping vowels from a term; or
    identifying non-lexical synonyms for the term of the query phrase or the term of the synonym phrase.

6. The storage medium of claim 5, wherein determining that a term of the query phrase is a lexical synonym of a corresponding term of the synonym phrase or shares meaning with the corresponding term of the synonym phrase comprises semantically comparing the term of the query phrase and the term of the synonym phrase.

7. The storage medium of claim 1, wherein the query phrase is a bi-gram that includes two terms.

8. The storage medium of claim 1, wherein the query phrase and the synonym phrase include an equal number of terms.

9. The storage medium of claim 6, wherein the operations are performed in conjunction with searching for synonyms for individual query terms.

10. The storage medium of claim 9, wherein receiving the candidate synonym for the query phrase comprises:
    gathering switching data from previous queries;
    wherein switching data from previous queries indicates how users have switched query terms and/or query phrases when modifying queries to improve query results; and
    using the switching data to identify candidate synonyms for query terms and query phrases.

11. The storage medium of claim 10, wherein gathering switching data from previous queries comprises:
    identifying possible query phrases from the previous queries; and
    generating probabilities of switching between query phrases based on patterns observed in the previous queries;
    wherein the switching probabilities are used to determine whether a switched query phrase will be considered as a candidate synonym for a query phrase.

12. The storage medium of claim 11,
wherein gathering switching data comprises gathering context data for other terms located in proximity to query terms or query phrases in previous queries; and
wherein generating the probabilities of switching between query phrases comprises using the context data to consider conditional probabilities.

13. The storage medium of claim 11, wherein if a switching probability is above a specified threshold, the switched phrase will be considered a candidate synonym.

14. The storage medium of claim 11,
wherein gathering switching data facilitates determining error-correction rules for queries; and
wherein determining error-correction rules facilitates identifying valid synonyms for a query phrase.

15. The storage medium of claim 9, wherein the operations further comprise:
identifying possible query phrases in a query by considering sub-phrases of the query; and
determining candidate synonyms for the possible query phrases.

16. The storage medium of claim 1, wherein a synonym for a query term or query phrase is a term or phrase which is substantially similar in meaning and/or produces query results similar to query results produced by the query term or query phrase.

17. The storage medium of claim 1, wherein determining that each term of the query phrase is a lexical synonym of a corresponding term of the synonym phrase or shares meaning with a corresponding term of the synonym phrase comprises:
determining that a first term of the query phrase is a lexical synonym of or shares meaning with a first term of the synonym phrase; and
determining that a second term of the query phrase is a lexical synonym of or shares meaning with a second term of the synonym phrase.

18. A computer system comprising one or more computers comprising computer-readable storage storing instructions that, when executed by the one or more computers, cause the one or more computers to perform operations comprising:
receiving a multi-term synonym phrase that is a candidate synonym for a multi-term query phrase; and
determining that each term of the query phrase is a lexical synonym of a corresponding term of the synonym phrase or shares meaning with the corresponding term of the synonym phrase;
in response to determining that each term of the query phrase is a lexical synonym of the corresponding term of the synonym phrase or shares meaning with the corresponding term of the synonym phrase, using the query phrase and the synonym phrase to improve a synonym mapping between a particular term of the query phrase and a term of the synonym phrase that corresponds to the particular term.

19. The system of claim 18, wherein improving a synonym mapping between a particular term of the query phrase and a term of the synonym phrase that corresponds to the particular term comprises using the term of the query phrase and the term of the synonym phrase to add and/or modify synonym mappings and/or context data for the term of the query phrase and the term of the synonym phrase.

20. The system of claim 18, wherein determining that a term of the query phrase is a lexical synonym of a corresponding term of the synonym phrase or shares meaning with the corresponding term of the synonym phrase comprises lexically comparing the term of the query phrase and the term of the synonym phrase.

21. The system of claim 20, wherein determining that a term of the query phrase is a lexical synonym of a corresponding term of the synonym phrase or shares meaning with the corresponding term of the synonym phrase includes determining that the query term and the term of the synonym phrase share a common stem.

22. The system of claim 21, wherein lexically comparing the term of the query phrase and the term of the synonym phrase includes one or more of the following:
removing punctuation and/or spacing from a term;
using an edit-distance technique to determine whether a substantial number of characters match between the term of the query phrase and the term of the synonym phrase;
removing diacritical marks from a term;
using a pseudostem technique to determine whether the term of the query phrase and the term of the synonym phrase share a common prefix;
using language-specific linguistic rules to facilitate detecting gender and/or number stemming across the term of the query phrase and the term of the synonym phrase;
identifying an abbreviation for a term;
stripping vowels from a term; or
identifying non-lexical synonyms for the term of the query phrase or the term of the synonym phrase.

23. The system of claim 22, wherein determining that a term of the query phrase is a lexical synonym of a corresponding term of the synonym phrase or shares meaning with the corresponding term of the synonym phrase comprises semantically comparing the term of the query phrase and the term of the synonym phrase.

24. The system of claim 18, wherein the query phrase is a bi-gram that includes two terms.

25. The system of claim 18, wherein the query phrase and the synonym phrase include an equal number of terms.

26. The system of claim 23, wherein the operations are performed in conjunction with searching for synonyms for individual query terms.

27. The system of claim 26, wherein receiving the candidate synonym for the query phrase comprises:
gathering switching data from previous queries;
wherein switching data from previous queries indicates how users have switched query terms and/or query phrases when modifying queries to improve query results; and
using the switching data to identify candidate synonyms for query terms and query phrases.

28. The system of claim 27, wherein gathering switching data from previous queries comprises:
identifying possible query phrases from the previous queries; and
generating probabilities of switching between query phrases based on patterns observed in the previous queries;
wherein the switching probabilities are used to determine whether a switched query phrase will be considered as a candidate synonym for a query phrase.

29. The system of claim 28,
wherein gathering switching data comprises gathering context data for other terms located in proximity to query terms or query phrases in previous queries; and
wherein generating the probabilities of switching between query phrases comprises using the context data to consider conditional probabilities.

30. The system of claim 28, wherein if a switching probability is above a specified threshold, the switched phrase will be considered a candidate synonym.

31. The system of claim 28,
  wherein gathering switching data facilitates determining error-correction rules for queries; and
  wherein determining error-correction rules facilitates identifying valid synonyms for a query phrase.

32. The system of claim 26, wherein the operations further comprise:
  identifying possible query phrases in a query by considering sub-phrases of the query; and
  determining candidate synonyms for the possible query phrases.

33. The system of claim 18, wherein a synonym for a query term or query phrase is a term or phrase which is substantially similar in meaning and/or produces query results similar to query results produced by the query term or query phrase.

34. The system of claim 18, wherein determining that each term of the query phrase is a lexical synonym of a corresponding term of the synonym phrase or shares meaning with a corresponding term of the synonym phrase comprises:
  determining that a first term of the query phrase is a lexical synonym of or shares meaning with a first term of the synonym phrase; and
  determining that a second term of the query phrase is a lexical synonym of or shares meaning with a second term of the synonym phrase.

35. A computer-implemented method comprising:
  receiving a multi-term synonym phrase that is a candidate synonym for a multi-term query phrase; and
  determining, using one or more computers, that each term of the query phrase is a lexical synonym of a corresponding term of the synonym phrase or shares meaning with the corresponding term of the synonym phrase;
  in response to determining that each term of the query phrase is a lexical synonym of the corresponding term of the synonym phrase or shares meaning with the corresponding term of the synonym phrase, using the query phrase and the synonym phrase to improve a synonym mapping between a particular term of the query phrase and a term of the synonym phrase that corresponds to the particular term.

36. The method of claim 35, wherein improving a synonym mapping between a particular term of the query phrase and a term of the synonym phrase that corresponds to the particular term comprises using the term of the query phrase and the term of the synonym phrase to add and/or modify synonym mappings and/or context data for the term of the query phrase and the term of the synonym phrase.

37. The method of claim 35, wherein determining that a term of the query phrase is a lexical synonym of a corresponding term of the synonym phrase or shares meaning with the corresponding term of the synonym phrase comprises lexically comparing the term of the query phrase and the term of the synonym phrase.

38. The method of claim 37, wherein determining that a term of the query phrase is a lexical synonym of a corresponding term of the synonym phrase or shares meaning with the corresponding term of the synonym phrase includes determining that the query term and the term of the synonym phrase share a common stem.

39. The method of claim 38, wherein lexically comparing the term of the query phrase and the term of the synonym phrase includes one or more of the following:
  removing punctuation and/or spacing from a term;
  using an edit-distance technique to determine whether a substantial number of characters match between the term of the query phrase and the term of the synonym phrase;
  removing diacritical marks from a term;
  using a pseudostem technique to determine whether the term of the query phrase and the term of the synonym phrase share a common prefix;
  using language-specific linguistic rules to facilitate detecting gender and/or number stemming across the term of the query phrase and the term of the synonym phrase;
  identifying an abbreviation for a term;
  stripping vowels from a term; or
  identifying non-lexical synonyms for the term of the query phrase or the term of the synonym phrase.

40. The method of claim 39, wherein determining that a term of the query phrase is a lexical synonym of a corresponding term of the synonym phrase or shares meaning with the corresponding term of the synonym phrase comprises semantically comparing the term of the query phrase and the term of the synonym phrase.

41. The method of claim 35, wherein the query phrase is a bi-gram that includes two terms.

42. The method of claim 35, wherein the query phrase and the synonym phrase include an equal number of terms.

43. The method of claim 40, wherein the operations are performed in conjunction with searching for synonyms for individual query terms.

44. The method of claim 43, wherein receiving the candidate synonym for the query phrase comprises:
  gathering switching data from previous queries;
  wherein switching data from previous queries indicates how users have switched query terms and/or query phrases when modifying queries to improve query results; and
  using the switching data to identify candidate synonyms for query terms and query phrases.

45. The method of claim 44, wherein gathering switching data from previous queries comprises:
  identifying possible query phrases from the previous queries; and
  generating probabilities of switching between query phrases based on patterns observed in the previous queries;
  wherein the switching probabilities are used to determine whether a switched query phrase will be considered as a candidate synonym for a query phrase.

46. The method of claim 45,
  wherein gathering switching data comprises gathering context data for other terms located in proximity to query terms or query phrases in previous queries; and
  wherein generating the probabilities of switching between query phrases comprises using the context data to consider conditional probabilities.

47. The method of claim 45, wherein if a switching probability is above a specified threshold, the switched phrase will be considered a candidate synonym.

48. The method of claim 45,
  wherein gathering switching data facilitates determining error-correction rules for queries; and
  wherein determining error-correction rules facilitates identifying valid synonyms for a query phrase.

49. The method of claim 43, wherein the operations further comprise:
  identifying possible query phrases in a query by considering sub-phrases of the query; and
  determining candidate synonyms for the possible query phrases.

50. The method of claim 35, wherein a synonym for a query term or query phrase is a term or phrase which is substantially similar in meaning and/or produces query results similar to query results produced by the query term or query phrase.

51. The method of claim 35, wherein determining that each term of the query phrase is a lexical synonym of a corresponding term of the synonym phrase or shares meaning with a corresponding term of the synonym phrase comprises:

determining that a first term of the query phrase is a lexical synonym of or shares meaning with a first term of the synonym phrase; and determining that a second term of the query phrase is a lexical synonym of or shares meaning with a second term of the synonym phrase.

\* \* \* \* \*